US012723888B1

(12) United States Patent
Franci Rodon

(10) Patent No.: US 12,723,888 B1
(45) Date of Patent: Sep. 1, 2026

(54) MAP QUALITY EVALUATION FRAMEWORK

(71) Applicant: Zoox, Inc., Foster City, CA (US)

(72) Inventor: Arnau Franci Rodon, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 416 days.

(21) Appl. No.: 18/325,635

(22) Filed: May 30, 2023

(51) Int. Cl.
*G01C 21/00* (2006.01)
*B60W 60/00* (2020.01)
*G01C 21/32* (2006.01)

(52) U.S. Cl.
CPC ....... *G01C 21/3804* (2020.08); *B60W 60/001* (2020.02); *G01C 21/32* (2013.01); *B60W 2556/10* (2020.02); *B60W 2556/20* (2020.02); *B60W 2556/40* (2020.02)

(58) Field of Classification Search
CPC . G01C 21/3804; G01C 21/32; B60W 60/001; B60W 2556/10; B60W 2556/20; B60W 2556/40
See application file for complete search history.

(56) References Cited

U.S. PATENT DOCUMENTS 8,527,199 B1 * 9/2013 Burnette ............ G01C 21/3848 701/425
11,274,930 B1 * 3/2022 Madhivanan ........ G01C 15/002
2013/0024104 A1 * 1/2013 Stahlin .................. G01C 21/28 701/409
2016/0004724 A1 * 1/2016 Har-Noy ............... G06F 16/587 709/219
2017/0039765 A1 * 2/2017 Zhou ....................... G06T 7/521
2018/0216942 A1 * 8/2018 Wang ...................... G01S 17/89
(Continued)

FOREIGN PATENT DOCUMENTS

CN 112815939 A * 5/2021 ............. G01C 21/20
CN 115930943 A * 4/2023
KR 20210042213 A * 4/2021 .............. G06N 3/09

OTHER PUBLICATIONS

Wolcott RW, Eustice RM. Robust LIDAR localization using multiresolution Gaussian mixture maps for autonomous driving. The International Journal of Robotics Research. 2017;36(3):292-319. doi:10.1177/0278364917696568 (Year: 2017).*
(Continued)

*Primary Examiner* — Faris S Almatrahi
*Assistant Examiner* — Selena M Jin
(74) *Attorney, Agent, or Firm* — Lee & Hayes, P.C.

(57) ABSTRACT

Techniques for determining objective map quality and evaluating updated maps against existing maps to determine an operational map for use in controlling a vehicle in an environment are disclosed. A map and map data for an environment may be determined based on collected sensor data. A variety of map quality indicators may be determined based on such data and used to determine an overall quality of the map. The overall quantity for the map may be compared to a current operational map for the environment. The operational map may be replaced with the newer map if the newer map has a higher map quality. Otherwise, the current operational map may be retained. The map quality measurements described herein may also be used to determine whether changes in map generation processes and operations result in improved quality maps.

20 Claims, 5 Drawing Sheets

(56) References Cited

U.S. PATENT DOCUMENTS

| | | | | |
|---|---|---|---|---|
| 2020/0158517 | A1* | 5/2020 | Tadi | G06T 7/248 |
| 2021/0302170 | A1* | 9/2021 | Xie | G01C 21/3804 |
| 2021/0331703 | A1* | 10/2021 | Duan | G05D 1/65 |
| 2022/0128366 | A1* | 4/2022 | Efland | G01C 21/387 |
| 2022/0291009 | A1* | 9/2022 | Imai | H04W 4/029 |
| 2022/0326023 | A1* | 10/2022 | Xu | B60W 60/001 |
| 2023/0016578 | A1* | 1/2023 | Williams | G01C 21/3863 |
| 2023/0024474 | A1* | 1/2023 | Ren | H04N 23/90 |
| 2023/0046001 | A1* | 2/2023 | Tanaka | G06T 7/74 |
| 2023/0140079 | A1* | 5/2023 | Zhu | G06V 20/58<br>382/103 |
| 2023/0400327 | A1* | 12/2023 | Streem | G01C 21/3804 |
| 2025/0172687 | A1* | 5/2025 | Li | G08G 5/50 |

OTHER PUBLICATIONS

Translation of CN-112815939-A (Year: 2021).*
Translation of CN-115930943-A (Year: 2023).*
Translation of KR-20210042213-A (Year: 2021).*

* cited by examiner

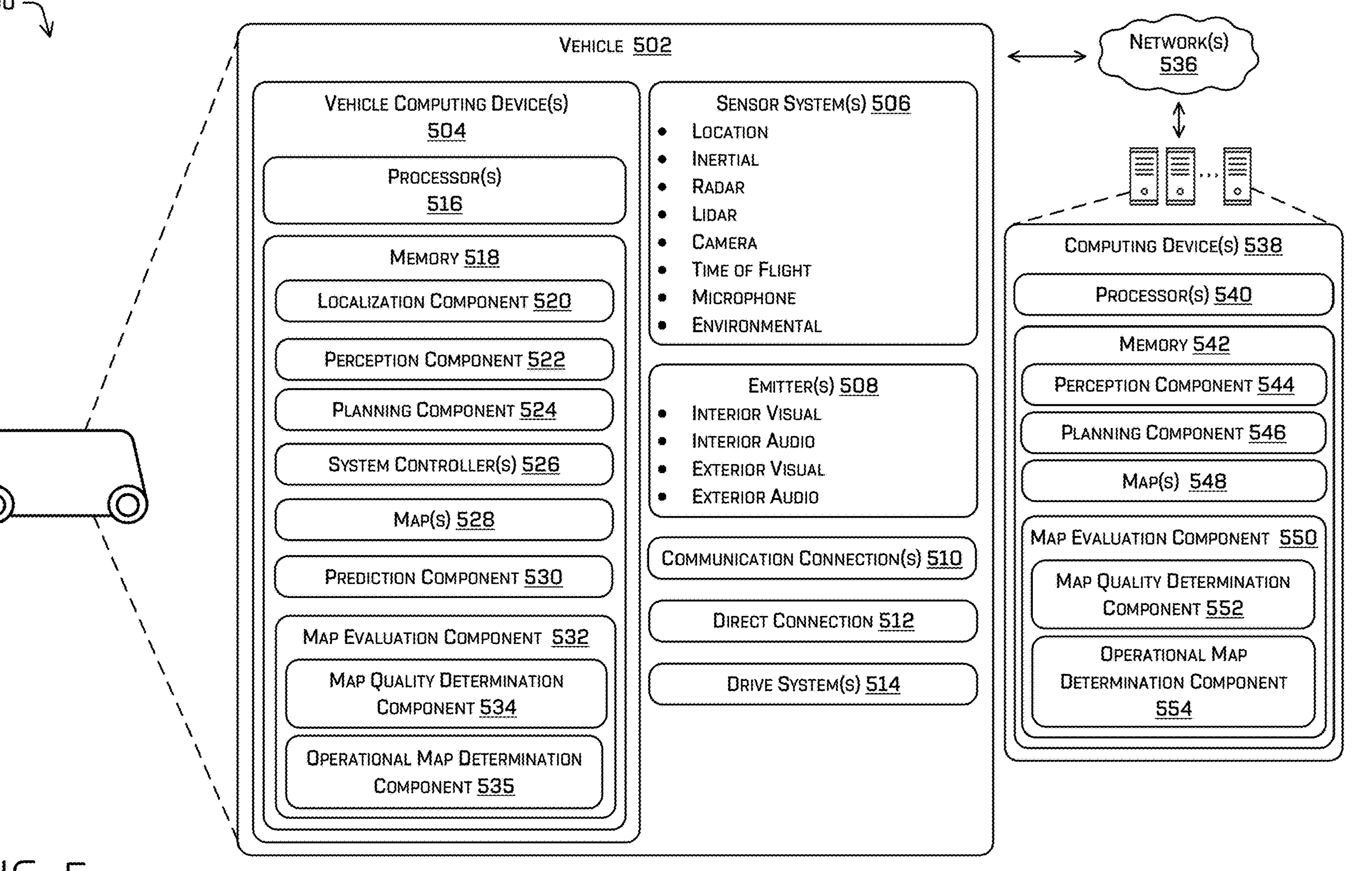
500
Vehicle 502
Vehicle Computing Device(s) 504
Processor(s) 516
Memory 518
Localization Component 520
Perception Component 522
Planning Component 524
System Controller(s) 526
Map(s) 528
Prediction Component 530
Map Evaluation Component 532
Map Quality Determination Component 534
Operational Map Determination Component 535
Sensor System(s) 506
• Location
• Inertial
• Radar
• Lidar
• Camera
• Time of Flight
• Microphone
• Environmental
Emitter(s) 508
• Interior Visual
• Interior Audio
• Exterior Visual
• Exterior Audio
Communication Connection(s) 510
Direct Connection 512
Drive System(s) 514
Network(s) 536
Computing Device(s) 538
Processor(s) 540
Memory 542
Perception Component 544
Planning Component 546
Map(s) 548
Map Evaluation Component 550
Map Quality Determination Component 552
Operational Map Determination Component 554
FIG. 5

MAP QUALITY EVALUATION FRAMEWORK

BACKGROUND

Various systems and techniques are utilized to generate maps of environments that may be used to control vehicles through such environments. For example, various types of sensors may be used to detect features in environments on which the generation of maps may be based. For example, autonomous vehicles may be configured with various types of sensor systems (e.g., lidar, radar, sonar, vision, etc.) that may be used to detect features and perform measurements within an environment while the vehicle is traveling within that environment. This data may be collected and used to generate three-dimensional maps of the environment that may then be used by other vehicles subsequently operating in that environment.

It can be very time consuming and resource intensive to generate a completely accurate three-dimensional map of an environment (e.g., based on ground truth data) without having full control of that environment. This is especially true for environments that change frequently, such as a real-world environment that includes drivable roadways on which autonomous vehicles may operate. Determining the quality of a map generated using sensor data and measurements without having ground truth data for the environment is typically a manual process that involves visual inspections of the map and/or subjective analysis of how "usable" the map is for actual vehicle control. Because environments frequently change, sensor and measurement data for any particular environment may be frequently collected and updated, resulting in frequent map updates. It may, at times, be challenging to efficiently and accurately determine a quality of frequently updated maps of an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is a block diagram of an example system for implementing the techniques described herein.

DETAILED DESCRIPTION

Figure 1:
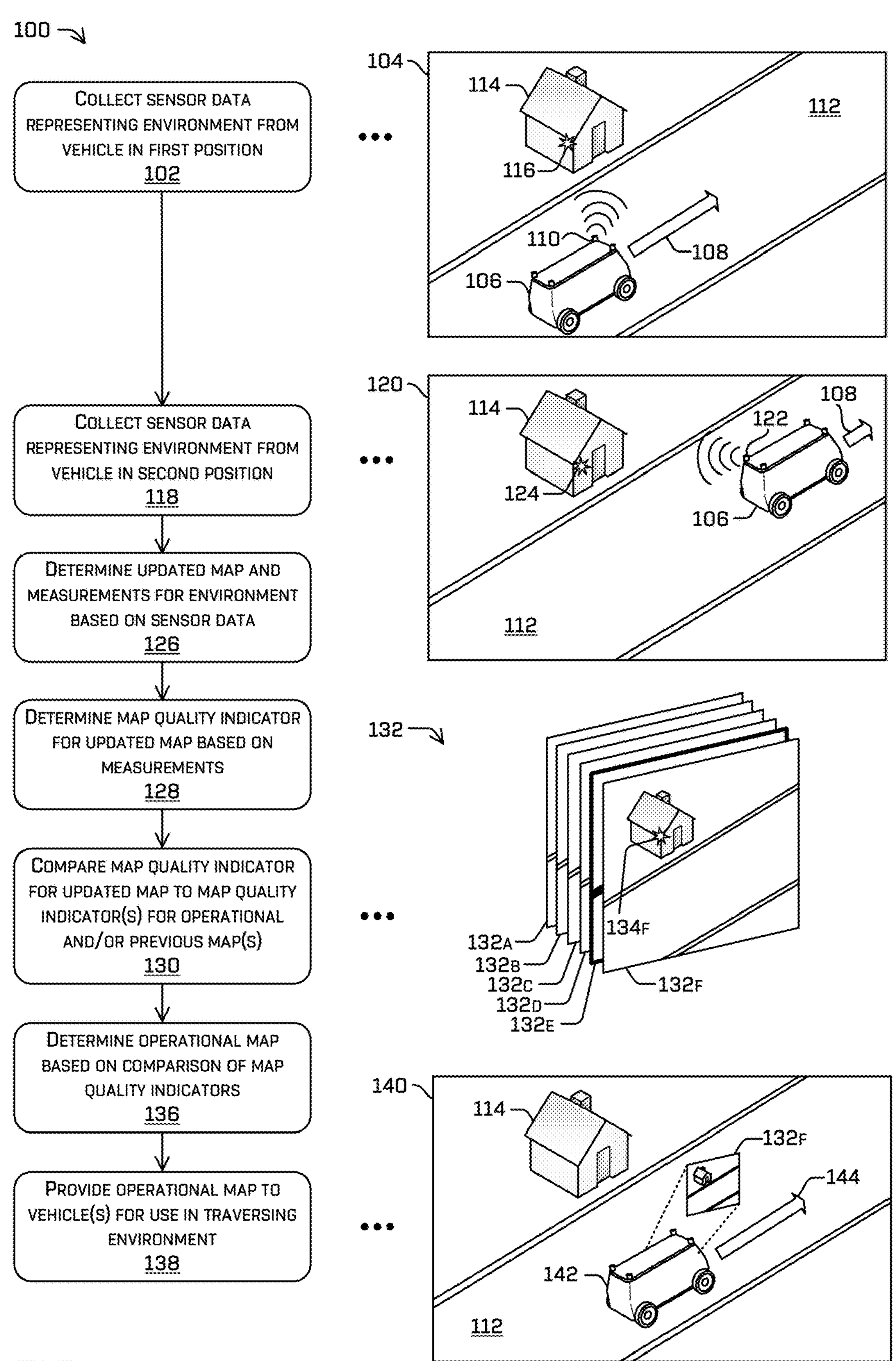
FIG. 1 is a pictorial flow diagram of an example process for determining a three-dimensional map for use in controlling a vehicle, in accordance with examples of the disclosure.

Techniques for improving the determination of an operational map for vehicle control discussed herein may include determining a map quality for an updated map based on collected sensor and measurement data and comparing the map quality to the determined quality of one or more other (e.g., previously generated) maps to determine an operational map for use in operating a vehicle in the mapped environment. As used herein, an operational map can be a map used by an autonomous vehicle to operate within an environment. An operational map may be stored locally at the autonomous vehicle and may be updated as necessary. The disclosed techniques may include determining a map representing measurements of an environment determined from sensor data collected in that environment. One or more quality indicators may be determined based on the measurements. The quality indicator(s) may be used to determine a value representing an overall map quality that may then be compared to map quality values determined for a current operational map and/or one or more other (e.g., previously generated) maps. The disclosed techniques may then be used to determine whether the quality of the newly generated map is better or worse than that of one or more other (e.g., previously generated) maps, or if such a determination may be not available. If the newly generated map for an environment has a better quality than an operational map for that environment (e.g., currently being used to facilitate vehicle operation in that environment), the operational map may be updated with the newly generated map. Otherwise, the operational map may be retained and the newly generated map and/or its associated data may be stored for further map quality operations and/or comparisons.

A vehicle computing system configured at a traversing an environment, such as an autonomous vehicle, may determine its current location by correlating environmental measurements based on collected sensor data to an operational map of the environment. The operational map may be locally stored or otherwise accessible to the vehicle computing system. The operational map may be a three-dimensional map that includes data representing locations and/or positions in three-dimensional space of particular objects and/or features in the environment. Such data may include one or more factor graphs representing vertices and edges in the environment. The operational map may be generated based on data (e.g., sensor data and associated measurements) collected and/or determined by sensor systems that have traversed the same environment in the past (e.g., configured at vehicles previously traversing the environment).

While traversing the environment, for example, according to a determined operational vehicle trajectory, the vehicle computing system may collect sensor data from one or more sensor systems to determine various measurements and/or environmental data that can then be compared to the operational map data to determine a location and/or position for the vehicle. Data that may be used to generate a map and/or a data structure representing a map of a portion of an environment may be referred to herein as "map data." The operation of a vehicle computing system determining a current vehicle location and/or position in an environment may be referred to as "localization." Localization may be accomplished by correlating the environmental data determined by the vehicle computing system based on sensor data with the environment as represented in its operational map. The vehicle computing system may then locate the vehicle in the operational map at a location corresponding to the detected location of the vehicle determined based on sensor data. In various examples, a vehicle computing system may use a simultaneous localization and mapping (SLAM) operations; calibration, localization and mapping, simultaneously CLAMS operations; relative SLAM operations; bundle adjustment; non-linear least squares optimization; etc.; to determine a location of the vehicle in an environment based on sensor data and an operational map.

In various examples, the vehicle computing system may collect sensor data using one or more sensors configured at the vehicle. Such sensor systems may include any one or more lidar sensors, radar sensors, sonar sensors, cameras, time-of-flight sensors, etc. These sensors systems may include emitters configured to emit electromagnetic radiation (e.g., light, sound, lasers, etc.) or other types of emissions into an environment and/or detect electromagnetic radiation and/or other emissions present in the environment (e.g., reflected from surfaces in the environment and/or emitted from objects in the environment). These sensor systems may generate or otherwise determine sensor data based on the detected emissions in the environment and provide this sensor data to the vehicle computing system. Using this sensor data, the vehicle computing system may determine or generate two-dimensional images, three-dimensional data, and/or scenes representing the environment. For example, the vehicle computing system may generate a three-dimensional map based on sensor data that represents vertices and edges in the environment as one or more factor graphs.

In addition to, or instead of, using collected sensor data to perform localization, the vehicle computing system may provide such sensor data, associated measurements, and/or mapping data to a mapping system configured to determine operational maps for environments using a map quality evaluation framework. Because of the varied and frequently changing aspects of environments in which vehicles, such as autonomous vehicles, may be operated, it can be difficult to determine ground truth data (e.g., ground truth data for the sensor data) for such environments. Moreover, the sensor data collected in an environment may be noisy, introducing errors and/or artifacts that are valid indications of detected surfaces. Therefore, it may be challenging for a mapping system to determine an operational map for such an environment because there may be no ground truth data to which to compare a map to determine the map's quality of representation of the real-world environment. "Map quality" as used herein may refer to the correlation of the map with the ground truth. In conventional systems, map quality may be determined by manual (e.g., user) inspection and evaluation of the map and/or based on the results of a vehicle actually using the map (e.g., for localization) while operating in the represented environment. As will be appreciated, such manual quality evaluations may be time-consuming and inefficient. Such quality evaluations may also be subjective as they may be dependent on individual user skill and/or biases.

In various examples, the mapping system may use newly (or more recently) received, collected, and/or determined sensor data, measurements, and/or mapping data for an environment to generate a map for the environment (referred to herein as an "updated map). The data used to generate an updated map be collected and/or generated by one or more vehicles (e.g., several vehicles) traversing the environment over one or more periods of time (e.g., a recent day, week, month, year, etc.). The mapping system may be configured to perform various operations to filter and/or reduce the representation of dynamic and/or temporary objects in the environments within the updated map to optimize the representation of permanent and/or otherwise immutable objects in the environments within the updated map. In various examples, an "updated" map may be generated using data more recently collected for the represented environment than data used to generate one or more other maps (e.g., that may be used in a quality comparison). For example, an updated map based on the most recently collected available mapping data may be compared (e.g., qualitatively as described herein) to an operational map based on older mapping data. Alternatively or additionally, an updated map may be generated using one or more operations and/or algorithms that differ from those used for a map to which the updated map may be qualitatively compared, regardless of the timeframe of collection of mapping data. For example, an updated map generated using a first particular operation may be based on the most recently collected available mapping data and may be compared (e.g., qualitatively as described herein) to another map generated using a second (e.g., different) operation that is also based on the most recently collected available mapping data.

The mapping system may be configured to objectively and/or automatically determine a quality of the updated map for the environment. The mapping system may then compare the quality of the updated map to the quality of the current operational map for the environment and/or one or more other maps that may be candidates for use as the operational map for the environment. If the quality of the updated map exceeds that of the current operational map, the mapping system may replace the current operational map with the updated map. Otherwise, the updated map and/or its associated map quality data may be stored for further mapping operations and/or analysis. For example, if an updated map is determined to be lower quality than a current operational map, the current operational map may be maintained as the operational map and the updated map and/or its associated map quality data may be stored for use in analyzing mapping operation improvement trends, algorithm development progress, regression testing, etc. Alternatively or additionally, if an updated map is determined to be lower quality than a current operational map, an indication or notification may be generated to request or recommend additional mapping data collection (e.g., in case the poorer quality map is the result of lower quality mapping data). For example, a notification may be generated that recommends one or more additional mapping traversals to collect additional mapping data for use in generating another subsequent updated map. Such a notification may include one or more specific recommendations based on determined map quality data. For example, the mapping system may determine particular areas in the environment, types of (e.g., sensor) data for collection, and/or other mapping data parameters for which the determination of additional mapping data is recommended.

The mapping system may also, or instead, objectively and/or automatically evaluate map quality based on updated mapping operations and/or algorithms. For example, if a particular edge determination operation has been updated or replaced, one or more updated maps may be generated based on stored map data using the updated operation. Map quality may then be determined for the updated maps based on one or more updated map quality indicators. The mapping system may perform the comparative map quality operations described herein to determine an operational map from among these updated maps.

In various examples, map quality for a particular map may be determined based on one or more map quality indicators. Such indicators may be determined based on various types of map data associated with the particular map that may include measurements and/or representations of the environment. Such indicators may also, or instead, be determined based on map data associated with one or more other maps and/or one or more other quality indicators. Based on these quality indicators, the mapping system may determine an overall map quality value for the particular map. This value may be compared to the map quality value for other maps to determine a comparative result. For example, the mapping system may determine whether the map quality for the particular map is better or worse than the map quality for another map. In examples, this comparison may not be determinable, in which case the mapping system may determine that the comparative map quality for the particular map in relation to another map is indeterminate. For example (e.g., in an updated processes or operations testing example), the map quality value (and/or the indicators on which the map quality value may be based) may be determined to be incongruent with a determined trend, and therefore the quality of the particular map may be indeterminate.

In various examples, an environment may be represented in a map as one or more factor graphs. A factor graph according to the disclosed examples may represent locations of a vehicle over time (e.g., while traveling along a trajectory and/or determined using one or more localization operations) and the determined locations of one or more detected landmarks (e.g., aspects of the environment detected based on sensor data) relative to the vehicle locations.

In examples, a factor graph G may be defined as G=(V, E), with V vertices and E edges. $L_i$ may be a set of edges belonging to a type of factor (e.g., a "link" type, such as a modality or sensor type (e.g., lidar, sonar, radar, etc.)), where $E=\{L_1, L_2, \ldots L_N\}$. $l_j^i$ may be the j-the element of a set of edges $L_i$. σ may be a robust loss function, where $\sigma_{Li}$ is the loss function for a link type $L_i$. Σ may be a covariance, for example, where $\Sigma_{lij}$ is the covariance of a link j of a link type $L_i$.

A map may be based on a trajectory T that may include one or more determined vehicle states (e.g., positions, locations poses, etc.) that may be included in the vertices V in the factor graph G. The vertices V may also, or instead, include one or more interpolated vehicle states (e.g., positions, locations poses, etc.) that may be located between the determined vehicle states, which may, for example, increase the density of vehicle states in the map along the trajectory T. A mesh M may represent a mesh and/or vectorized map data (e.g., three-dimensional map data). M may be determined representing sensor (e.g., lidar, sonar, radar, etc.) measurements along the trajectory T. In examples, a set of lidar measurements may be referred to as a "metaspin." A pair of a particular trajectory T and a corresponding mesh M may be represented as M={T, M}. z may be a point in a set of measurements Z (e.g., in a set of lidar measurements, or metaspin), where $Z=\{Z_1, Z_2, \ldots Z_n\}$ is the total set of n sets of measurements (e.g., metaspins).

In examples, map quality indicators may include a weighted sum of average link cost (WSALC) value. A WSALC value may be calculated for a trajectory on which a map (e.g., a three-dimensional reconstruction of an environment) may be based. A WSALC value may essentially measure the dissonance (e.g., lack of agreement) between states of a vehicle (e.g., vehicle poses and/or other vehicle state parameters represented by the vertices Vin the factor graph G) at various points along a trajectory through the environment and sensor measurements (e.g., from one or more modalities and represented as M measurements along the trajectory T) collected by the vehicle at those various points along the trajectory. The resulting WSALC value may indicate a degree of correspondence between a map (e.g., a three-dimensional reconstruction of an environment based on sensor measurements) and the trajectory (e.g., based on vehicle poses and/or vehicle state data) on which the map is based. In other words, the WSALC value may indicate how well the map and the associated trajectory appear to agree on the state and/or configuration of the environment.

In examples, a WSALC value may be determined based on a factor graph G representing the trajectory on which a map may be generated a cost function $f$ for a map as described above that may be defined as shown below in equation (1).

$$f = \sum_{i=1}^{N} \sum_{j=1}^{|\mathcal{L}_i|} \sigma_{\mathcal{L}_i}\left(\sum\nolimits_{l_j^i}^{-1/2} r^{\mathcal{L}_i}\left(l_j^i\right)\right) \tag{1}$$

In this example, the noise introduced into measurements of a set of measurements Z may be assumed to be Gaussian. In other examples, the noise may be of other forms and other distributions and/or the presence of outliers may also be handled using a suitable loss function that may be, for example, selected based on the associated sensor modality or link type. For instance, a particular robust loss function may be used for odometry links (e.g. motion data) while a different robust loss function may be used for camera reprojection links (e.g., image data), etc. Further in this example, the lower the value off, the more accurate the map may be (e.g., the closer to an optimal state (e.g., trajectory and landmarks)). The value of $f$ is dependent on the number of factors in the factor graph G. Therefore, modifications to the operations used to generate the factor graph (e.g., increasing the number of vehicle states (e.g., poses, positions), adding new classes of landmarks, etc.) may affect the final value of $f$, but may not clearly indicate a changed overall quality of the map.

A WSALC may represent a proxy for a final cost function value that may be independent of the size of the factor graph G. A WSALC value may include determining a weight equivalent of the contribution of an individual link type $L_i$ to the cost and adding the cost portion for the individual link type normalized by the associated number of links. Such a weight may be defined as $w_i$ and determined using equation (2) shown below.

$$w_i = \frac{\sum_{j}^{|\mathcal{L}_i|} \sigma_{\mathcal{L}_i}\left(\sum\nolimits_{l_j^i}^{-1/2} r^{\mathcal{L}_i}\left(l_j^i\right)\right)}{f} \tag{2}$$

Using the weights $w_i$, a WSALC map quality indicator may be determined for a particular map represented by a factor graph that includes N types of factors using equation (3) shown below. In examples, the WSALC value may be between 0 and infinity, with values closer to 0 representing greater map quality.

$$WSALC = \sum_{i=1}^{N} \frac{w_i}{|\mathcal{L}_i|} \sum_{j=1}^{|\mathcal{L}_i|} \sigma_{\mathcal{L}_i}\left(\sum\nolimits_{l_j^i}^{-1/2} r^{\mathcal{L}_i}(l_j^i)\right) \quad (3)$$

In examples, map quality indicators may include an average mesh posterior rate (AMPR) value. An AMPR value may be based on a map that is a dense three-dimensional reconstruction of the environment based on various sensor measurements. The AMPR value may represent a level of agreement between reprojections of such sensor measurements using the trajectory on which the map was based and the corresponding points as represented in the map (e.g., where the map is in a dense three-dimensional reconstruction of the environment). The greater the difference between these measurements and map points may manifest as a higher AMPR indicating a lower map quality. In some examples, the AMPR value may be associated with a map for which one or more WSALC values are also determined. Because the map quality may be initially indicated by the WSALC, the utility or usefulness of the AMPR may be reduced for lower quality values of WSALC.

It may be desirable to maximize the probability of outputting a trajectory and mesh M (e.g., a sparse mesh) based on a set of sets of measurements Z (e.g., a set of metaspins). This probability may be represented as p(M|Z). While it may not be possible to directly calculate p(M|Z), in examples, all meshes and trajectories may be assumed to be equally likely to be produced and the p(Z) may be considered to be constant. In such examples, by applying Bayes rule, p(Z|M) =kp(M|Z). In other words, the posterior distribution of the measurements given the trajectory and mesh is directly proportional to the posterior of the trajectory and mesh given the measurements, which may be used as a related measurement. In this example, the posterior of all sets of measurements Z given a trajectory and mesh may be the joint probability of the individual measurements for the individual sets of measurements Z.

Using the elements as described above and defining a particular measurement as z and an associated posterior probability as z', an AMPR for a particular map may be determined using equation (4) shown below. In examples, the AMPR value may be between 0 and infinity, with values closer to 0 representing greater map quality. In equation (4), covariance may be assumed to be isotropic and/or not (e.g., very) asymmetric. Furthermore, equation (4) may represent a normalization for the number of total measurements z and an assumption that all measurements are positive. An AMPR value may represent a measurement of the quality of fit between a mesh and associated (e.g., lidar) measurements.

$$AMPR = \frac{1}{|\mathcal{Z}|} \sum_{Z \in \mathcal{Z}} \frac{1}{|Z|} \sum_{z \in Z} \sigma(z - z') \quad (4)$$

In examples, map quality indicators may include a map stability (MS) value. An MS value may quantify the repeatability of map output based on WSALC values for maps that are associated with overlapping trajectories determined independently. An MS value may further be used to determine an optimal number of mapping traversals (e.g., by a vehicle configured to collect sensor data) through a particular environment in order to generate a map. This may in turn result in fewer unnecessary mapping traversals of an environment, thereby resulting in increased resource usage efficiency.

In this example, "overlapping loops" may be represented as ol and may be a number of laps or traversals of a particular environment based on a particular trajectory. In other words, an ol may represent a number of superimposed trajectories mapping the same portion of an environment. Further in this example, MS may be a sample variance of a WSALC determined independently for an individual lap or traversal. $\overline{\text{WSALC}}$ may be a sample mean of (e.g., every) WSALC determined for individual laps or traversals of the overlapping loops ol. Accordingly, an MS value for a particular map may be determined using equation (5) shown below. In examples, the MS value may be between 0 and infinity, with values closer to 0 representing greater map quality.

$$MS = \sum\nolimits_{i=1}^{ol} \frac{(WSALC_i - \overline{WSALC})^2}{ol - 1} \quad (5)$$

In examples of equation (5) above, AMPR values and sample means may be in place of WSALC. Alternatively, AMPR and WSALC values may be used together in equation (5) above. For example, a first MS value may be determined using AMPR values and sample means and a second MS value may be determined using WSALC values and sample means. This first and second MS value may then be averaged to determine a third MS value that may be used as the MS map quality indicator.

In examples, these three map quality indicators (WSALC, AMPR, and MS) may be used together to determine an overall map quality indicator that may then be compared to one or more overall map quality indicators for one or more corresponding other maps, such as a current operational map, to determine a comparative quality. If a particular map (e.g., a map generated using more recently obtained sensor data) is of a better quality than a currently operational map for a particular environment, the currently operational map may be replaced with the newer map. Using these values, a mapping system may automatically and without manual user interaction determine an improved operational map for use by vehicles operating in an environment.

The overall map quality indicator may be determined as a vector with the three indicators as individual elements of the vector. The vector representation of the overall map quality value ("map quality values vector") may then be compared to vector representations of one or more other map quality values vectors associated with one or more other corresponding maps. Alternatively or additionally, a single overall map quality value may be determined using one or more operations based on the WSALC value, the AMPR value, and the MS value. For example, these values may be weighted and/or averaged or manipulated using one or more other operations or algorithms to determine a single overall map quality value.

Maps and/or their associated indicators (e.g., associated map quality data) may also be stored and evaluated to determine trends in map quality. For example, various operations in a mapping system may be updated and/or replaced over time. The disclosed examples allow a comparison of the objective map quality of maps generated using updated operations to the objective map quality of maps generated using previous operations. In this way, mapping system operators may efficiently and readily determine whether updated operations are improvements and/or identify any issues as new operations are tested and/or rolled out into a production environment.

There may be operations performed by a vehicle computing system and/or a mapping system that are dependent on an operational three-dimensional map. Therefore, determining an operational map using the map quality evaluation framework described herein may improve such operations by providing a more accurate and higher quality three-dimensional map for use in such operations. For example, two-dimensional maps may be generated by various operations using a three-dimensional map. Such operations may include vehicle control operations that may affect the efficiency and safety of vehicle operation, as well as passenger comfort and safety. Higher quality three-dimensional maps may, therefore, result in safer and more efficient vehicle operations as well as improved passenger comfort and safety.

The systems and techniques described herein may be directed to leveraging sensor data and associated data to improve the quality of maps used by a vehicle, such as an autonomous vehicle, for operating in an environment. More specifically, the disclosed systems and techniques may be directed to objectively determining map quality to facilitate the generation of more accurate maps and the determination of improved map generation processes and operations. Using this improved map quality data, more accurate maps may be provided to a vehicle computing system for control in an environment, which may allow the vehicle computing system to generate safer and more efficient trajectories for use in navigating through an environment. In particular examples, the systems and techniques described herein can utilize various types of sensor data For example, techniques described herein may increase the efficiency of determining maps for an environment, reducing the likelihood of use of outdated and/or inaccurate maps in controlling vehicles in that environment. By using the map quality evaluation framework described herein, a mapping system may automatically and efficiently determine a map's objective quality and whether to replace a current operational map with an updated map, eliminating the need for manual human intervention in such determinations. That is, the techniques described herein provide a technological improvement over existing mapping generation and/or selection technology and map quality determination technology. In addition to improving the accuracy of maps and efficiency of determining operational maps, the systems and techniques described herein can provide a smoother ride and improve safety outcomes by, for example, more accurately providing safe passage to an intended destination through an environment based on higher quality and more current maps. Moreover, the systems and techniques may prevent unnecessary braking or hard braking to avoid obstacles or zones in an environment that may not be represented in a lower quality or out-of-date map.

The techniques described herein may also improve the operation of computing systems and increase resource utilization efficiency. For example, computing systems, such as mapping systems, may more efficiently perform operational map determinations using the techniques described herein because, by automatically determining objective map quality indicators and values, the disclosed examples may reduce or eliminate the amount of manual map quality grading required to determine operational maps. The disclosed examples may also reduce the data processing required to test and evaluate map generation operations because the disclosed examples allow the efficient and automatic determination of objective map quality. The quality of maps generated using adjusted processes may then be compared to objective quality measurements of maps generated using other processes rapidly determine whether the adjusted processes represent an improvement. This reduction in testing and evaluation time for mapping processes increases the overall efficiency of improving such systems over what would be possible using conventional techniques. Moreover, the techniques discussed herein may reduce the amount of data used by computing systems to determine and process map data as the number of traversals of an environment to generate a map may be reduced based on determining an optimal number of mapping traversals using the techniques described herein. Extraneous mapping traversals may be avoided and, therefore, the data and processing associated with such unnecessary traversals may be eliminated, which may reduce latency, memory usage, power, time, and/or computing cycles required to generate an operational map for an environment.

The systems and techniques described herein can be implemented in several ways. Example implementations are provided below with reference to the following figures. Although discussed in the context of an autonomous vehicle and providing operational maps to an autonomous vehicle, the techniques described herein can be applied to a variety of systems (e.g., a sensor system or a robotic platform, augmented reality and/or virtual reality systems (e.g. headsets), other mobile and/or sensor-configured systems (e.g., smartphones)) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, any one or more of various types of sensors and emitters are contemplated, as well as various types of sensor data (e.g., lidar, sonar, radar, vision). Furthermore, the disclosed systems and techniques may include using various types of components and various types of data and data structures, including, but not limited to, various types of image data and/or sensor data (e.g., stereo cameras, time-of-flight data, radar data, sonar data, vision data, lidar data, and the like). For example, the techniques may be applied to any such sensor systems. Additionally, the techniques described herein can be used with real data (e.g., captured using sensors), simulated data (e.g., generated by a simulator), or any combination of the two.

Figure 3:
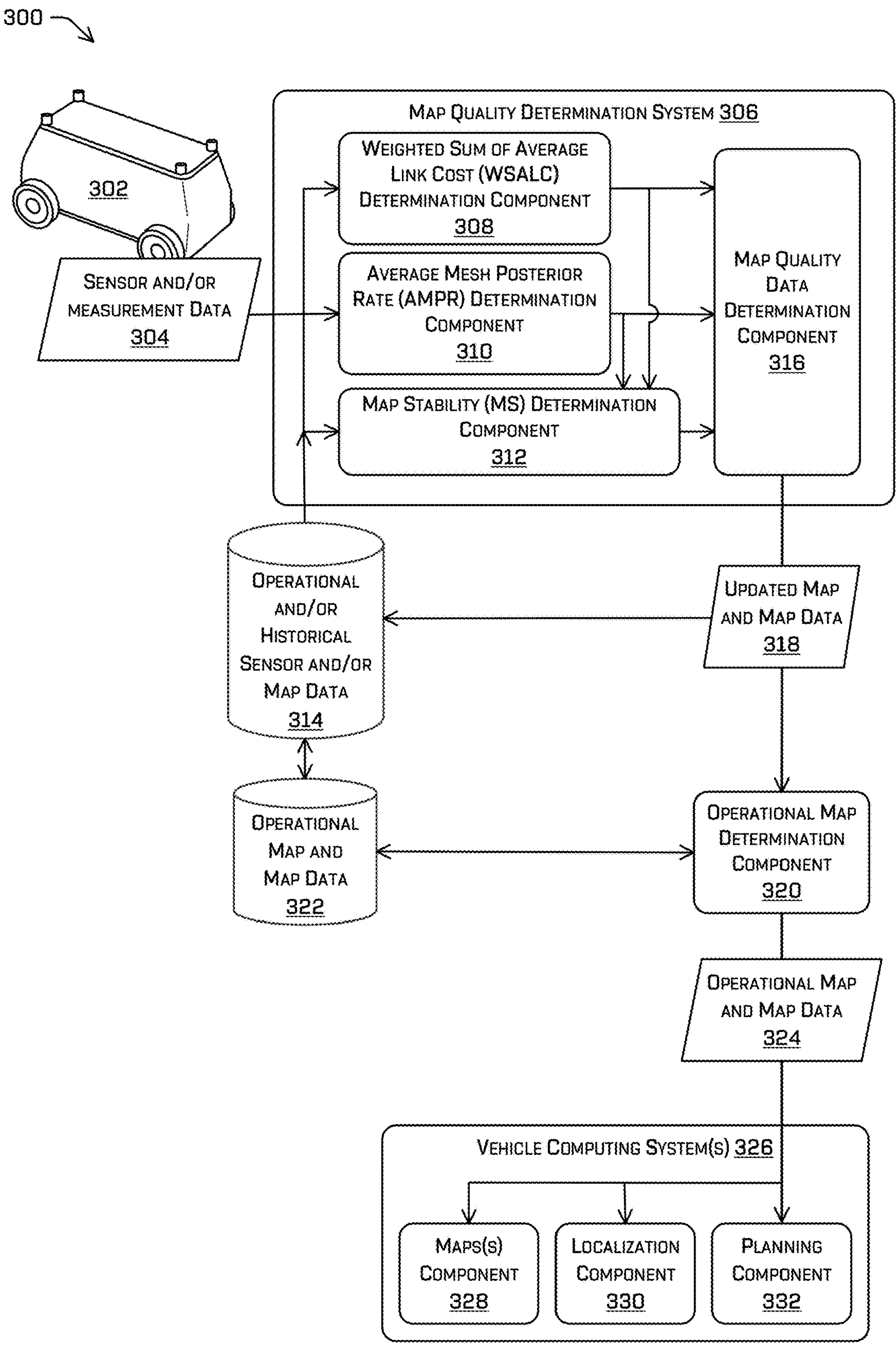
FIG. 3 is a block diagram of an example system for implementing a map quality evaluation framework, in accordance with examples of the disclosure.

FIG. 1 is a pictorial flow diagram of an example process 100 for determining map quality and an operational map that may be used by a vehicle computing system to control a vehicle within an environment. In some examples, one or more operations of the process 100 may be implemented by a mapping system, such as by using one or more of the components and systems illustrated in FIG. 3 and described below, and/or by a vehicle computing system, such as by using one or more of the components and systems illustrated in FIG. 5 and described below. For example, one or more components and systems can include those associated with one or more of the map quality determination system 306 or the operational map determination component 320 of FIG. 3 and/or the map evaluation component 532 of FIG. 5. In some examples, the one or more operations of the process 100 may also, or instead, be performed by a remote system that may be in communication with a vehicle, such as the map evaluation component 550 illustrated in FIG. 5. In still other examples, the one or more operations of the process 100 may be performed by a combination of a remote system and a vehicle computing systems. However, the process 100 is not limited to being performed by such components and systems, and the components and systems of FIGS. 3 and 5 are not limited to performing the process 100.

At operation 102, sensor data representing an environment in which a vehicle may be traveling may be received at a vehicle computing system or other computing system while a vehicle is in a first position in the environment. In particular examples, this sensor data may include one or more types of sensor data associated with one or more types of sensor systems, including, but not limited to, vision data associated with a vision system, lidar data associated with a lidar system, radar data associated with a radar system, sonar data associated with a sonar system, etc. In various examples, the sensor data may include lidar metaspins associated with a particular vehicle location along a trajectory that may be used to control the vehicle through an environment. This data may be used to generate a factor graph that may represent the first location of the vehicle along the trajectory and locations of one or more detected landmarks (e.g., aspects of the environment) relative to the first location and determined based on sensor data.

An example 104 illustrates a perspective view of a portion of an environment that may be detected and mapped using sensor data such as that received at operation 102. In the portion of the environment represented in example 104, a vehicle 106 may represent a vehicle traveling within the environment along a trajectory 108 on a roadway 112. The vehicle 106 may be configured with one or more sensors, such as sensor 110. The vehicle 106 (e.g., a vehicle computing system configured at the vehicle 106) may collect and/or generate sensor data associated with various objects and/or surfaces in the environment. For example, the vehicle 106 may collect, via sensor 110, sensor data associated with a house 114. Specifically, the vehicle 106 may collect a sensor detection at a point 116 on a surface of a house 114. For example, the point 116 may be represented in a point cloud generated by a lidar sensor system. This detection may be used to generate a factor graph indicating a position of the vehicle 106 along the trajectory 108 at the time of collection of the sensor data point 116 and the location of the point 116.

At operation 118, further sensor data representing the environment in which the vehicle may be traveling may be received at the vehicle computing system or other computing system while the vehicle is in a second position in the environment. For example, further sensor data may be collected from a subsequent position of the vehicle after it has traversed a portion of the environment while traveling along the trajectory. Here again, this sensor data may include lidar metaspins associated with the new (e.g., subsequent) vehicle location along the trajectory used to control the vehicle through the environment. As with the data of operation 102, this data may be used to generate a factor graph and/or update the factor graph described in regard to operation 102 to represent the second first location of the vehicle along the trajectory and locations of one or more detected landmarks (e.g., aspects of the environment) relative to the second location and determined based on the subsequently collected sensor data.

An example 120 illustrates a perspective view of the portion of the environment illustrated in example 104. In this example, the vehicle 106 may have further traversed the environment based on the trajectory 108 (e.g., as compared to the example 104) and may have collected subsequent sensor data, such as that received at operation 118, from an updated vehicle position using one or more of its sensor, such as sensor 122. For example, the vehicle 106 may collect, via sensor 122, sensor data associated with a house 114. Specifically, in this example, the vehicle 106 may collect a sensor detection at a point 124 on a surface of a house 114. Here again, the point 124 may be represented in a point cloud generated by a lidar sensor system. This detection may be used to generate or update a factor graph indicating a position of the vehicle 106 along the trajectory 108 at the time of collection of the sensor data point 124 and the location of the point 124.

At operation 126, an updated map and/or map data may be determined based on the data collected in operations 102 and 118. In examples, a vehicle computing system may transmit collected sensor data and/or associated data (e.g., measurements based on sensor data) to a mapping system for use in determining this updated map and associated map data. Alternatively or additionally, a vehicle computing system may generate a map and/or map data using sensor data and/or associated data that it may then transmit to a mapping system. Regardless, the generated map and/or map data may include one or more factor graphs representing various positions of the vehicle along a particular trajectory and corresponding locations of one or more detected landmarks determined based on one or more types of sensor data.

In various examples, the "points" generated for a map that are associated with landmarks or other surfaces detected in the environment (e.g., relative to the vehicle and as represented in a factor graph) may be a mean value of a plurality of measurements determined using a particular sensor type. For example, a point in a lidar data set or metaspin may represent an averaged lidar measurement based on multiple lidar reflections proximate to a particular physical location on a particular landmark.

At operation 128, the mapping system may determine one or more map quality indicators and/or values for the map and/or map data determined at operation 126. As described in more detail herein, the mapping system may determine one or more of a WSALC value, an AMPR value, and an MS value based on the map and/or map data and, in some examples, based on other maps and/or map data. The mapping system may also, or instead, determine an overall map quality value (e.g., as a vector or a single value), for example, based on one or more of a WSALC value, an AMPR value, and an MS value determined for the map data.

At operation 130, the mapping system may compare the map quality indicator(s)/value(s) for the map and/or map data associated with operations 102 and 118 with one or more map quality indicator(s)/value(s) for one or more other maps. For example, a mapping system may maintain a current operational map for a particular portion of an environment (e.g., associated with a particular trajectory through that portion of the environment). The mapping system may provide this operational map to vehicles that have been configured to traverse that portion of the environment. The mapping system may compare the one or more map quality indicator(s)/value(s) determined for the map and/or map data associated with operations 102 and 118 with one or more map quality indicator(s)/value(s) associated with the operational map.

In other examples, the mapping system may compare the one or more map quality indicators and/or values determined for the map and/or map data associated with operations 102 and 118 with one or more map quality indicators and/or values for one or more other maps (e.g., other than, or in addition to, an operational map). For example, a new process or operation may be implemented at a mapping system. Existing map data may be reprocessed by the mapping system to generate new maps based on the existing data. The quality indicator(s)/value(s) of these new maps may then be determined and compared to the quality indicator(s)/value(s)

of the previous maps generated based on the same data. If the quality indicator(s)/value(s) are better for the new maps, the operator of the mapping system may determine that the new process or operation is an improvement. On the other hand, if the quality indicator(s)/value(s) are poorer for the new maps, the operator of the mapping system may determine that the new process or operation is not an improvement over the previous process or operation.

Example plurality of maps 132 may be compared to one another, for example, for determining an operational map. In examples, the individual maps 132*a-e* may be associated with particular, distinct timeframes (e.g., timeframes of collection of the data on which the respective map may be based). For example, the map 132*f* may be the newest map (e.g., based on the most recently collected mapping data) of the environment of examples 104 and 120 and may be compared to the next newest map 132*e* (e.g., based on the next most recently collected mapping data), which may also be the current operational map. Some or all of the maps 132*a-f* may include a detected point on the house 114, represented as 134*f* in map 132*f*.

At operation 136, an operational map may be determined based on the comparison of map quality indicators and/or values performed at operation 130. For example, if the recently updated or otherwise newest map (e.g., the map generated based on map data associated with operations 102 and 118) has a higher quality value than the current operational map, the mapping system may replace the current operational map with the recently updated or otherwise newest map. If the recently updated or otherwise newest map has a lower quality value than the current operational map, the mapping system may retain the current operational map. The mapping system may store the recently updated or otherwise newest map and/or its data for use in further mapping operations and/or operations analysis or it may discard the map and/or its data.

At operation 138, the mapping system may provide the operational map as determined at operation 136 to one or more vehicles for use in operating in the corresponding environment. For example, the mapping system may provide or otherwise make available the operational map to one or more autonomous vehicles for localization operations and/or other operations.

An example 140 illustrates the environment of examples 104 and 120 with a different vehicle 142 traversing this portion of the environment along a trajectory 144. A mapping system may have determined that the newer map 132*f* of the maps in the example maps 132 is a higher quality map than a previous operational map and therefore may have made the map 132*f* the operational map for this portion of the environment and/or for trajectories similar to trajectory 108 and/or 144. Thus, vehicle 142 is illustrated in this example as being configured with map 132*f* that it may use, for example, to perform localization operations in the environment.

Figure 2:
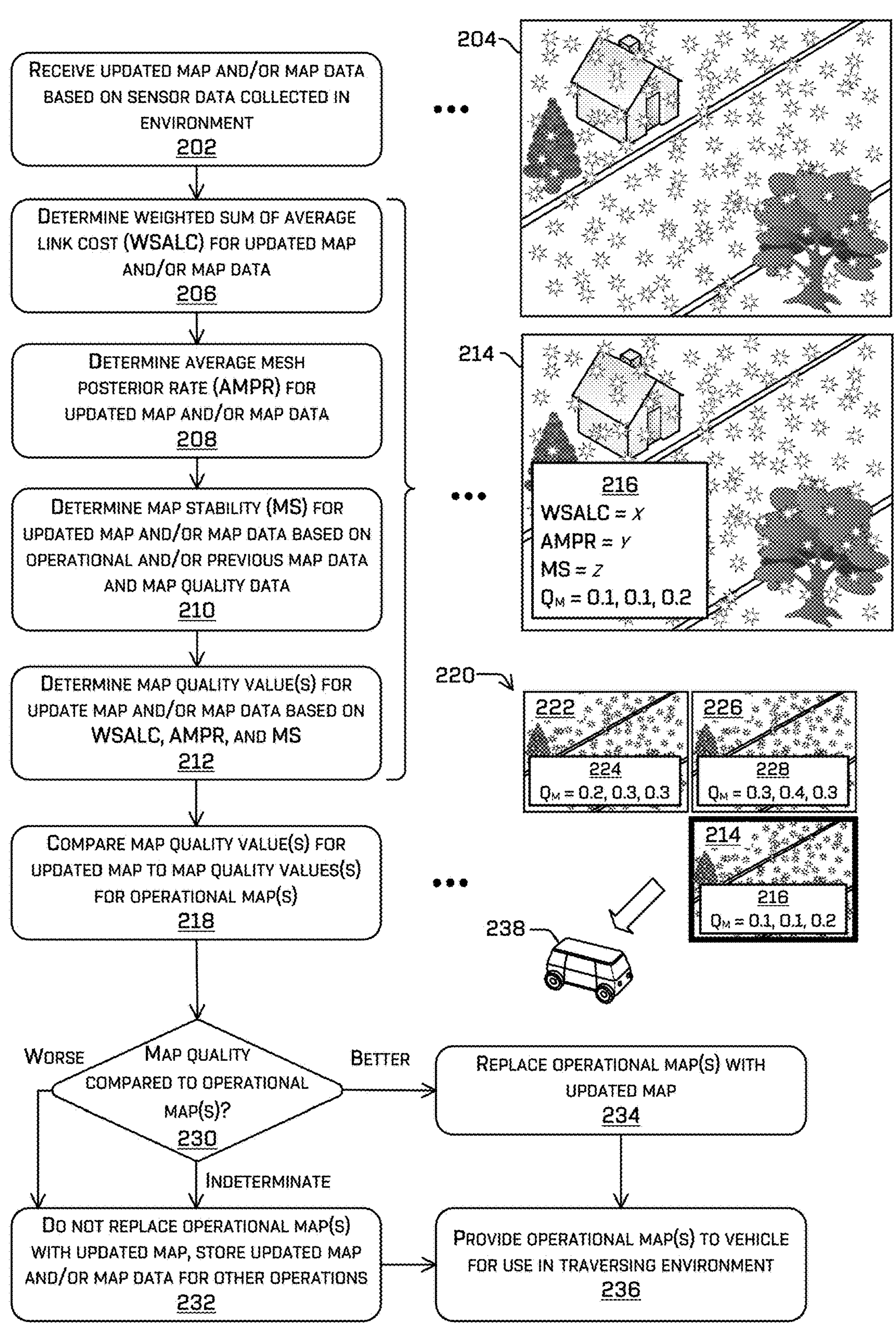
FIG. 2 is a pictorial flow diagram of another example process for determining a three-dimensional map quality and an operational map for use in controlling a vehicle, in accordance with examples of the disclosure.

FIG. 2 is a pictorial flow diagram of an example process 200 for determining map quality and determining an operational map that may be used by a vehicle computing system to control a vehicle within an environment. In some examples, one or more operations of the process 200 may be implemented by a mapping system, such as by using one or more of the components and systems illustrated in FIG. 3 and described below, and/or by a vehicle computing system, such as by using one or more of the components and systems illustrated in FIG. 5 and described below. For example, one or more components and systems can include those associated with one or more of the map quality determination system 306 or the operational map determination component 320 of FIG. 3 and/or the map evaluation component 532 of FIG. 5. In some examples, the one or more operations of the process 200 may also, or instead, be performed by a remote system that may be in communication with a vehicle, such as the map evaluation component 550 illustrated in FIG. 5. In still other examples, the one or more operations of the process 200 may be performed by a combination of a remote system and a vehicle computing systems. However, the process 200 is not limited to being performed by such components and systems, and the components and systems of FIGS. 3 and 5 are not limited to performing the process 200.

At operation 202, a mapping system may receive an updated map for a particular portion of an environment and/or updated data that may be used to generate an updated map for that portion of the environment. For example, the mapping system may receive an updated map and/or map data from a vehicle traversing that portion of the environment (e.g., where the portion of the environment is associated with one or more particular trajectories used by the vehicle). The mapping system may maintain one or more other maps and/or map data for that portion of the environment, for example, generated based on sensor data collected at an earlier time than the sensor data on which the updated map and/or map data is based. The mapping system may also have one or more determined map quality indicators and/or values stored with such other maps and/or map data. Alternatively or additionally, the mapping system may generate such indicators and/or values as needed using stored map and/or map data.

An example updated map 204 illustrates a map of a portion of an environment that may include objects and surfaces as shown (e.g., a house, trees, a roadway).

Based on the updated map and/or map data received at operation 202, the mapping system may initiate map quality evaluation framework operations as described herein. At operation 206, the mapping system may determine a first map quality indicator by determining a WSALC value for the updated map and/or map data (e.g., for the trajectory used to build the map). As described in more detail above, the WSALC value may indicate how well the map and the associated trajectory appear to agree on the state and/or configuration of the environment and may provide a proxy for the cost function of the received updated map and/or map data. This cost function proxy value may be used in the disclosed map quality evaluation framework to at least partially determine a map quality values vector or an overall map quality value, in examples, in combination with one or more other map quality indicators. As described herein, a map quality values vector or an overall map quality value may be used to determine a comparative map quality among multiple maps. In other examples, a WSALC value may be used independently of other map quality indicators to determine a map quality. In examples, a lower WSALC value (e.g., a lower cost function) may indicate a higher quality map.

At operation 208, the mapping system may determine a second map quality indicator by determining an AMPR value for the updated map and/or map data (e.g. based on the trajectory used at 206 for determining WSALC). For example, the AMPR value determination may be based on a map that is a dense three-dimensional reconstruction of the environment based on lidar measurements. The AMPR value may represent a level of agreement between reprojections of such lidar measurements and the corresponding points in the dense three-dimensional reconstruction of the environment. The greater the difference between these measurements and map points may manifest as a higher AMPR indicating a lower map quality. Other modalities may also, or instead, be used for AMPR determinations. As described in more detail above, the AMPR value may provide an indication of a fit quality between a mesh and associated sensor measurements by indicating a deviation between the mesh and the associated sensor measurements (e.g., the lower the value of the AMPR, the less deviation and therefore the greater the fit). This fit quality value may be used in the disclosed map quality evaluation framework to at least partially determine a map quality values vector or an overall map quality value, in examples, in combination with one or more other map quality indicators. As described herein, a map quality values vector or an overall map quality value may be used to determine a comparative map quality among multiple maps. In other examples, an AMPR value may be used independently of other map quality indicators to determine a map quality. In examples, a lower AMPR value (e.g., lower deviation between the mesh and the associated sensor measurements) may indicate a higher quality map.

At operation 210, the mapping system may determine a third map quality indicator by determining an MS value for the updated map and/or map data. As described in more detail above, the MS value may provide a consistency level representing the consistency of determined map data over time (e.g., the repeatability of map output, for example, based on sensor data collected over time) by representing a deviation between maps over time (e.g., the lower the value of the MS, the less deviation between maps over time). Also as described above, this MS determination operation may use the WSALC value determined at operation 206 and/or one or more WSALC values associated with one or more other maps (e.g., maps determined based on sensor data collected during previous mapping traversals of the associated environment). Alternatively or additionally, the MS value may be determined using the AMPR value determined at operation 208 and/or one or more AMPR values associated with one or more other maps (e.g., maps determined based on sensor data collected during previous mapping traversals of the associated environment). This repeatability value may be used in the disclosed map quality evaluation framework to at least partially determine a map quality values vector and/or an overall map quality value, in examples, in combination with one or more other map quality indicators. As described herein, the map quality values vector and/or overall map quality value may be used to determine a comparative map quality among multiple maps. In other examples, an MS value may be used independently of other map quality indicators to determine a map quality. In examples, a lower MS value (e.g., lower deviation between maps over time) may indicate a higher quality map.

At operation 212, a map quality values vector with the individual indicators (e.g., the WSALC value, the AMPR value, and the MS value) represented as elements of the vector may be determined for the map quality. Alternatively or additionally, an overall map quality value may be determined based on the WSALC value, the AMPR value, and the MS value determined at operations 206, 208, and 210, respectively. This overall map quality value may be an average, mean, or other algorithmically determined value based on the WSALC value, the AMPR value, and the MS value, or maybe a value determined based on these three indicators and other data using one or more other operations or algorithms. In examples, lower map quality values vector or a lower overall map quality value may be associated with a higher quality map.

Example updated map data 214 illustrates the example map 204 including map quality data that includes the determined map quality indicators WSALC, AMPR, and MS, along with a map quality values vector represented as QM.

At operation 218, the determined map quality value for the updated map and/or map data may be compared to one or more other such values for one or more other maps. For example, the map quality value for an updated map of a particular portion of an environment may be compared to the map quality value for an operational map that may be currently in use for operating vehicles in that particular portion of an environment. Alternatively or additionally, the map quality value for an updated map of an environment may be compared to map quality values for one or more other maps of the environment to determine the results of a process or operation adjustment, upgrade, replacement, etc. as described herein.

An example 220 illustrates the example updated map data 214 including the determined map quality indicators WSALC, AMPR, and MS, along with the map quality values vector $Q_M$ for that map, in comparison to map data 222 including map quality data 224 and map data 226 including map quality data 228. As can be seen in this example, map quality values $Q_M$ from map quality data 216 for the map data 214 may be lower than that for the maps associated with map data 222 and map data 226, as reflected in the map quality data 224 and the map quality data 228, respectively. Based on these map quality values, the map quality of the map associated with updated map data 214 may be of higher quality than the other maps illustrated (e.g., due to the lower map quality value).

At operation 230, the mapping system may determine whether the map quality of the updated map is better or worse than that of the operational map, or if such a determination is not possible. For example, the mapping system may (e.g., perform a vector comparison to) determine if (e.g., all) the map quality value(s) for the updated map are lower or higher than the (e.g., corresponding) map quality value(s) for the operational map. If the map quality value(s) for the updated map are lower than the map quality value(s) for the operational map, the mapping system may determine that the updated map is better than the operational map. If the map quality value(s) for the updated map are higher than the map quality value(s) for the operational map, the mapping system may determine that the operational map is better than the updated map. In some examples, the comparative results may be indeterminate. For example, where map quality may be represented as a vector of map quality indicators, if one or more vector elements for an updated map are lower than the corresponding elements for the current operational map, while one or more other vector elements for the updated map are higher than the corresponding elements for the current operational map, the system may determine that the map quality comparison results may be determined to be indeterminate. In another example, where one or more map quality values (and/or the indicators on which the map quality value may be based) are determined to be incongruent with a determined trend (e.g., in updated operations testing examples), the map quality comparison results may be determined to be indeterminate.

If, at operation 230, the mapping system determines that the updated map is of lower quality than the operational map and/or that the comparative quality is not determinable, at operation 232, the mapping system may retain the current operational map for use as an operational map and may store the updated map and/or map data for future use. The mapping system may proceed to operation 236 to continue to provide the current (unchanged) operational map to one or more vehicles for traversing the portion of the environment represented by such a map. The mapping system may also generate an indication or notification that additional and/or updated mapping data should be acquired to determine a future, higher quality map. For example, such a notification may include a recommendation that one or more additional environment traversals should be performed in order to acquire updated sensor data and/or other data that may be used to determine a higher quality map.

If, at operation 230, the mapping system determines that the updated map is of higher quality than the operational map, at operation 234, the mapping system may replace the current operational map with the updated map for use as an operational map. The mapping system may also, or instead, may store the former operational map and/or map data and the updated map and/or map data for future use. The mapping system may proceed to operation 236 to continue to provide the current (updated) operational map to one or more vehicles for traversing the portion of the environment represented by such a map.

Returning to example 220, because the mapping system may have determined that the updated map data 214 is of higher quality than one or more other maps that may be available as operational maps, the mapping system may select the map data 214 for use as an operational map. The mapping system may provide the map data 214 and/or a map based therein to a vehicle 238 for use in traversing the portion of the environment represented by the map data 214.

FIG. 3 is a block diagram of an example mapping system 300 according to various examples. The system 300 may be implemented at a remote in communication with a vehicle computing system configured at a vehicle (e.g., an autonomous vehicle) and may include one or more of the remote components and systems illustrated in FIG. 5 described below. Alternatively or additionally, the system 300 may be implemented at a vehicle computing system configured at a vehicle and may include one or more of the vehicle components and systems illustrated in FIG. 5 described below. For example, one or more components and systems can include those associated with one or more of the map evaluation component 532, maps component 528, map evaluation component 550, and/or the maps component 548. In still other examples, one or more operations of the system 300 may be implemented as a combination of components at a remote system and a vehicle computing system. However, the system 300 is not limited to being performed by such components and systems, and the components and systems of FIG. 5 are not limited to implementing the system 300.

A vehicle 302 may collect and/or determine sensor and/or measurement data 304. The sensor and/or measurement data 304 may be generated, determined, received, and/or provided to the mapping system 300. In various examples, such sensor and/or measurement data may be associated with data collected and/or generated by one or more sensors configured on the vehicle 302 that may be traveling through an environment. The sensor and/or measurement data 304 may include lidar data, radar data, sonar data, vision data, infrared data, ultrasonic data, time-of-flight data, etc. The sensor and/or measurement data 304 may also, or instead, include any type of two-dimensional data and/or three-dimensional data that may be associated with an environment. For example, the sensor and/or measurement data 304 may include one or more detection points in three-dimensional space and associated measurements (e.g., determined distance, time of delay, etc.). In examples, the sensor and/or measurement data 304 may further include labels and/or labeling information that may be associated with two-dimensional data (e.g., pixels) and/or three-dimensional data (e.g., voxels). The sensor and/or measurement data 304 may be retested by or otherwise included in one or more multi-channel data structures with individual channels representing data associated with a particular type of sensor or particular sensor system (e.g., vision, lidar, radar, sonar, time-of-flight, etc.) and/or one or more other types of data. In examples, the sensor and/or measurement data 304 may include a map and/or map data that may, for example, be represented as one or more factor graphs as described herein. Such factor graphs may be generated at the vehicle 302 and/or may be determined elsewhere in the mapping system 300 (e.g., at the map quality determination system 306 and/or at another mapping system component).

The sensor and/or measurement data 304 may be provided to a map quality determination system 306 that may be configured to determine a map quality value or values for a map and/or associated map data. For example, the map quality determination system 306 may perform one or more map quality indicator determination operations to determine map quality values vector and/or an overall map quality value for a particular map and/or associated map data.

The map quality determination system 306 may include one or more components configured to perform (e.g., individual) map quality indicator determinations. For example, the map quality determination system 306 may include a WSALC determination component 308 configured to determine a WSALC value based on the sensor and/or measurement data 304, as described herein. The WSALC determination component 308 may also access and/or retrieve data (e.g., sensor data, measurement data) from an operational and/or historical sensor and/or map data store 314 for use in WSALC value determinations. The map quality determination system 306 may also, or instead, include an AMPR determination component 310 configured to determine an AMPR value based on the sensor and/or measurement data 304, as described herein. The AMPR determination component 310 may also access and/or retrieve data (e.g., sensor data, measurement data) from the operational and/or historical sensor and/or map data store 314 for use in AMPR value determinations. The map quality determination system 306 may also, or instead, include an MS determination component 312 configured to determine an AMPR value based on the sensor and/or measurement data 304, as described herein.

In examples, the MS determination component 312 may use data associated with one or more other maps (e.g., WSALC data, AMPR data) to determine an MS value (as described above). The MS determination component 312 may access and/or retrieve such data from an operational and/or historical sensor and/or map data store 314. The MS determination component 312 may also, or instead, use one or more WSALC values determined based on the sensor and/or measurement data 304 that may be provided by the WSALC determination component 308 to determine an MS value. The MS determination component 312 may also, or instead, use one or more AMPR values determined based on the sensor and/or measurement data 304 that may be provided by the AMPR determination component 310 to determine an MS value.

The WSALC determination component 308, the AMPR determination component 310, and the MS determination component 312 may perform their respective operations in parallel, for example, substantially simultaneously executing their respective operations (e.g., on separate processors, as separate threads or processes executed in parallel on a same processor, etc.).

The output of the WSALC determination component 308, the AMPR determination component 310, and the MS determination component 312 (e.g., map quality indicators) may be provided to a map quality data determination component 316. The map quality data determination component 316 may be configured to use such output to determine a map quality value (e.g., a map quality values vector and/or an overall map quality value as described herein) for the map data associated with the sensor and/or measurement data 304. The map quality data determination component 316 may generate updated map and map data 318 that may include the determined map quality value and/or one or more of the map quality indicators determined by the WSALC determination component 308, the AMPR determination component 310, and the MS determination component 312.

The map quality data determination component 316 may provide the updated map and map data 318 to the operational and/or historical sensor and/or map data store 314 for potential use in further operations. The map quality data determination component 316 may also, or instead, provide the updated map and map data 318 to an operational map determination component 320.

The operational map determination component 320 may access an operational map from the operational map and map data store 322 for use in an environment by one or more vehicles (such as vehicle 302 and/or a vehicle associated with a vehicle computing system(s) 326). The operational map stored at the operational map and map data store 322 may be a copy of a map and/or map data stored at and/or accessed from the operational and/or historical sensor and/or map data store 314 (e.g., for use in mapping operations, providing to vehicles, etc.).

The operational map determination component 320 may determine whether the updated map and map data 318 is of a better or worse quality than the operational map stored at the operational map and map data store 322 that may be currently in use for vehicle operations. If so, the operational map determination component 320 may replace the operational map stored at the operational map and map data store 322 with the updated map and map data 318, storing the former operational map and map data at the operational and/or historical sensor and/or map data store 314 and/or updating data associated with the former operational map and map data to indicate that such data is no longer associated with a current operational map and map data. If the operational map determination component 320 determines that the updated map and map data 318 are of lower quality than the operational map stored at the operational map and map data store 322, the operational map determination component 320 may retain the current operational map stored at the operational map and map data store 322 and discard the updated map and map data 318 (e.g., where the updated map and map data 318 may have already been stored at the operational and/or historical sensor and/or map data store 314).

The operational map determination component 320 may retrieve and provide an operational map and map data 324 from the operational map and map data store 322 to provide to one or more vehicles, such as a vehicle configured with a vehicle computing system 326. The vehicle computing system 326 may use the operational map and map data 324 for various vehicle control operations.

For example, a planning component 332 of the vehicle computing system 326 may use the operational map and map data 324 to determine a trajectory and/or route through the environment represented by the operational map and map data 324. A localization component 330 of the vehicle computing system 326 may use the operational map and map data 324 to determine a current vehicle location and/or position within the environment represented by the operational map and map data 324. A map(s) component 328 of the vehicle computing system 326 may use the operational map and map data 324 to determine one or more other maps, such as determining or generating one or more two-dimensional maps and/or two-dimensional map data based on three-dimensional map data represented in the operational map and map data 324. The output of the operational map determination component 320 and/or the map quality determination system 306 may also, or instead, be provided to one or more of the other components described herein for various operations that may use such maps, map data, and/or map quality data.

Figure 4A:
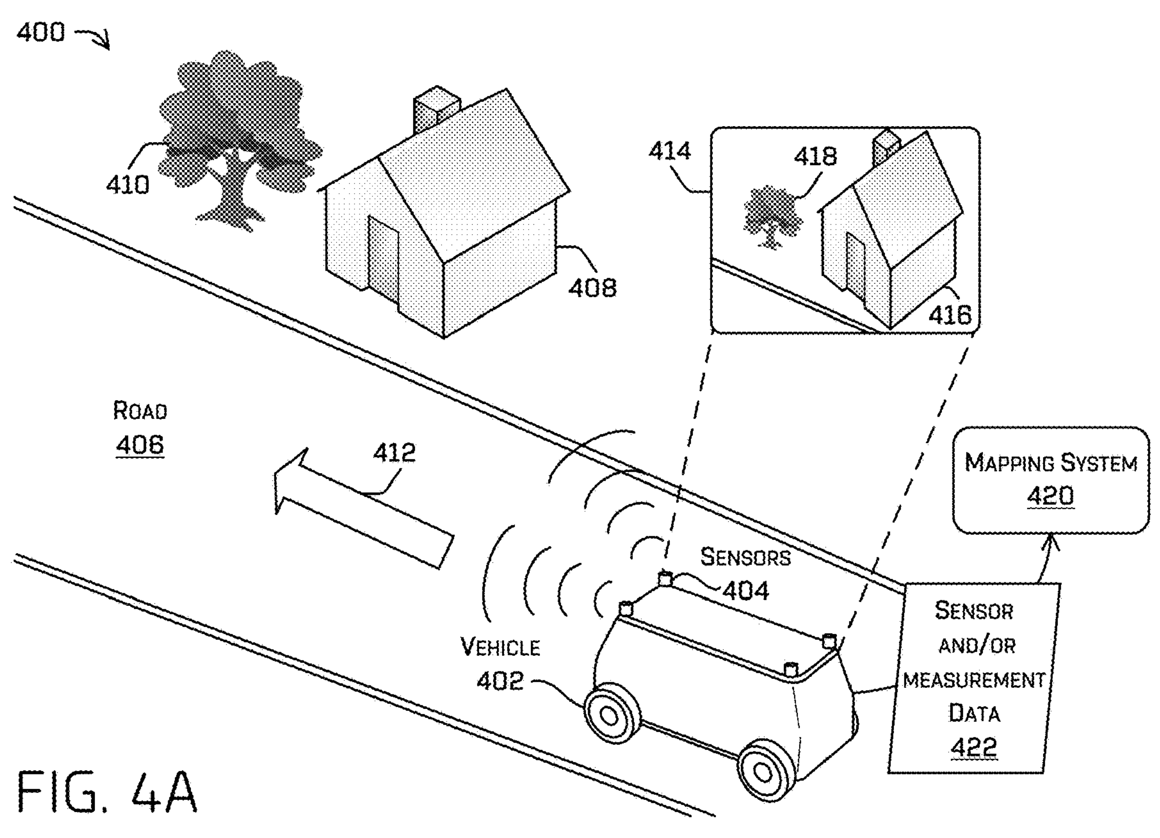
FIG. 4A is a diagram of an example environment in which a vehicle may operate using a map determined by a map quality evaluation system, and in which the vehicle may collect data for use by such a system, in accordance with examples of the disclosure.

FIG. 4A is a perspective view of an example environment 400 in which a vehicle 402 may be traveling. There may be various features, surfaces, objects, and other detectable aspects in the environment 400, such as a road 406, a house 408, and a tree 410. The vehicle 402 may be configured with one or more sensor systems 404 that may include any one or more sensors of any type (e.g., lidar, radar, sonar, vision, time-of-flight, ultrasonic, infrared, etc.). The vehicle 402 may be traversing the environment based on a trajectory 412. To facilitate vehicle control and operation along the trajectory 412 in the environment 400, the vehicle 402 may use an operational map 414. The operational map 414 may include representations of features, surfaces, objects, and other detectable aspects in the environment 400 that may have been generated for the map 414 based on sensor data and measurements collected by other vehicles that have previously traversed the environment 400 (e.g., using a trajectory similar to or substantially the same as trajectory 412). For example, the operational map 414 may include a representation 416 of the house 408 and a representation 418 of the tree 410. The operational map 414 may be provided by and/or accessed from a mapping system 420.

The vehicle 402, using sensor systems 404 and/or a vehicle computing system, may collect sensor data and/or determine measurements based on sensor data collected by one or more sensors (e.g., lidar, radar, sonar, cameras, time-of-flight, etc.). For example, the vehicle 402 may generate sensor and/or measurement data 422 that may include sensor data, detections, and/or measurements associated with detected surfaces, features, objects, and/or other aspects of the environment 400, such as house 408 and tree 410. The vehicle 402 may transmit sensor and/or measurement data 422 to the mapping system 420.

The mapping system 420 may use sensor and/or measurement data provided by one or more vehicles traversing the environment 400 to determine updated maps and mapping data and/or an operational map and mapping data for use by vehicles operating in the environment 400. For example, the mapping system 420 may determine an updated map and/or mapping data based on the sensor and/or measurement data 422. The mapping system 420 may further determine one or more map quality indicators, map quality values vectors, and/or one or more overall map quality values for this updated map. The mapping system may then compare the map quality data determined for the updated map to the map quality data for the operational map 414. If the map quality data for the updated map indicated that the updated map is of better map quality than the operational map 414, the mapping system 420 may replace the operational map 414 with the updated map based on the sensor and/or measurement data 422.

Figure 4B:
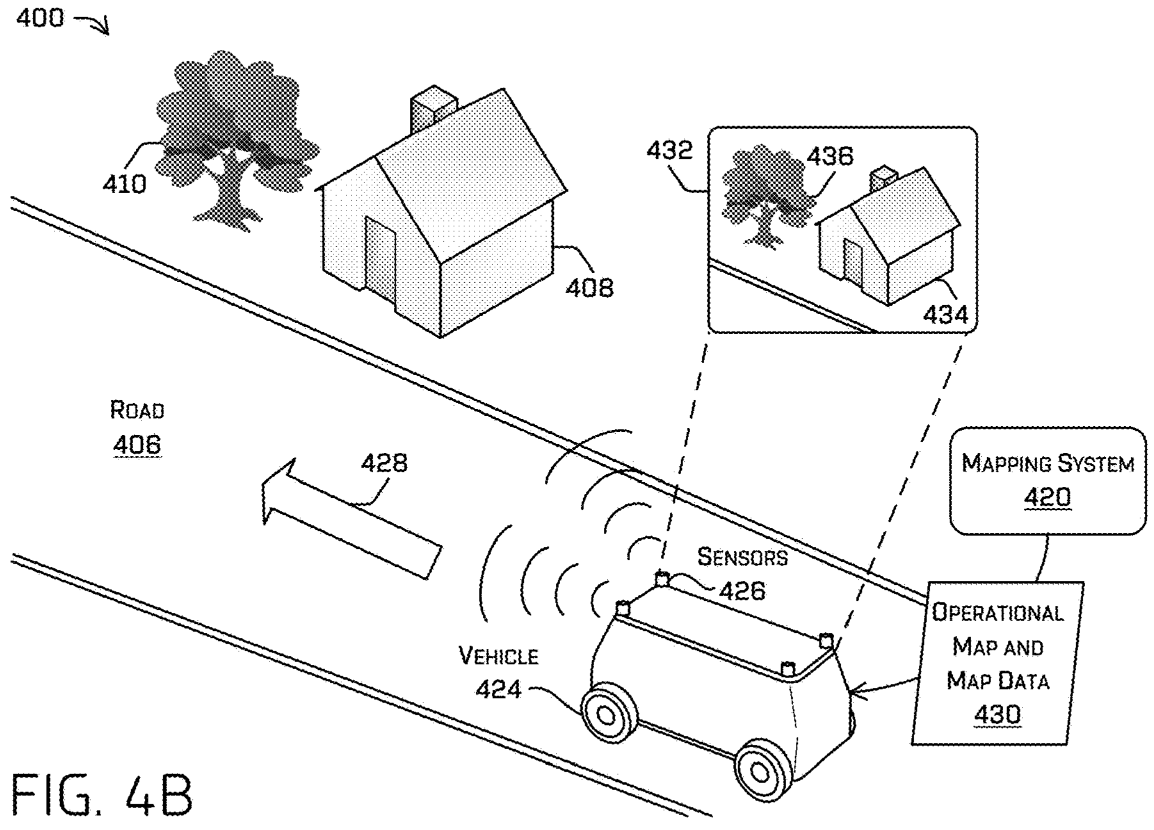
FIG. 4B is a diagram of the example environment of FIG. 4A in which another vehicle may be operating using an updated map determined by the map quality evaluation system based on the data collected by the vehicle of FIG. 4A, in accordance with examples of the disclosure.

FIG. 4B provides another perspective view of the example environment 400, where a vehicle 424 (e.g., a different vehicle than vehicle 402) may be traversing the environment 400 based on a trajectory 428. The vehicle 424 may be configured with one or more sensor systems 426 that may be similar to one or more sensor systems 404 configured at vehicle 402. The vehicle 424 may be operating in the environment 400 at some time after the vehicle 402 has traversed the environment 400 and provided the sensor and/or measurement data 422 to the mapping system 420. Using the one or more sensor systems 426, the vehicle 424 may also provide sensor data and/or measurements to the mapping system 420. The trajectory 428 used by the vehicle 424 may be substantially similar to the trajectory 412 used by the vehicle 402 earlier.

The mapping system 420 may have determined that an updated map based on the sensor and/or measurement data 422 of FIG. 4A is of higher quality than the operational map 414 of FIG. 4A. Therefore, the mapping system 420 may generate and/or determine updated operational map and map data 430 that the mapping system 420 may provide to the vehicle 424 for use in operating in the environment 400. The map and map data 430 may be selected and/or determined based on the environment 400 and/or the trajectory 428.

The vehicle 424 may determine an operational map 432 based on the operational map and map data 430 received from the mapping system 420. The operational map 432 may include representations of features, surfaces, objects, and other detectable aspects in the environment 400 that may have been represented in the operational map 414 and/or determined based on sensor data and measurements collected by other vehicles that have previously traversed the environment 400 (e.g., sensor and/or measurement data 422 collected by vehicle 402 using the trajectory 412 as illustrated in FIG. 4A). For example, like the operational map 414 of FIG. 4A, the updated operational map 432 may include a representation 434 of the house 408 and a representation 436 of the tree 410. As can be seen from these figures, the updated operational map 432 may include more accurate representations of the environment 400 than the operational map 414, and therefore may be of higher map quality, as determined by the mapping system 420 based on the disclosed map quality indicators.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, and a map evaluation component 532 that may include a map quality determination component 534 and an operational map determination component 535. Though depicted in FIG. 5 as residing in memory 518 for illustrative purposes, it is contemplated that any one or more of the localization component 520, the perception component 522, the planning component 524, the one or more system controllers 526, the one or more maps 528, the prediction component 530, the map evaluation component 532, the map quality determination component 534, and the operational map determination component 535 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment (e.g., determined based on the disclosed map quality evaluation framework) and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, construction zone detection and labeling and machine-learned model training operations as described herein. For example, the perception component may include functionality to analyze sensor data to determine whether to label pixels in images as construction zone pixels, as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, unknown).

In additional or alternative examples, the perception component 522 can provide processed sensor data that indicates one or more characteristics associated with a detected entity (e.g., a tracked object) and/or the environment in which the entity is positioned. The perception component 522 may use the multichannel data structures, such as the voxel data structures generated and two-dimensional sensor data, to generate processed sensor data, which may take the form of two-dimensional images in some examples. In some examples, characteristics associated with an entity or object can include, but are not limited to, an x-position (global and/or local position), ay-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a multichannel data structure, a two-dimensional grid of cells containing data, a two-dimensional representation of a portion of an environment from a sensor perspective, a two-dimensional image, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. In some examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment and can be loaded into working memory as needed. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 538) accessible via network(s) 536. In some examples, multiple maps 528 can be stored based on, for example, a characteristic (e.g., type of entity, time of day, day of week, season of the year). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior. In some examples, the prediction component 530 can use data and/or data structures based on return pulses as described herein to generate one or more predicted trajectories for various mobile objects in an environment. In some examples, the prediction component 530 may be a subcomponent of perception component 522.

The memory 518 can further include one or more map evaluation components 532 that may perform the one or more of the operations described herein and/or any other operations associated with a mapping system implementing a map quality evaluation framework. The map evaluation component(s) 532 may include one or more of a map quality determination component 534 and/or an operation map determination component 535. In some examples, the one or more maps 528 can be stored on a remote computing device(s) (such as the computing device(s) 538) accessible via network(s) 536. In some examples, map evaluation components may be stored on a remote system, such as remote computing device 538 that may be configured with a map evaluation component(s) 550 that may include one or more of a map quality determination component 552 and/or an operation map determination component 554.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may include one or more convolution/deconvolution layers. Such a CNN may be a component of and/or interact with a classification component configured to classify objects and/or detections (e.g., based on sensor data).

An example neural network is an algorithm that passes input data through a series of connected layers to produce an output. Individual layers in a neural network can also comprise another neural network or can comprise any number of layers, and such individual layers may be convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time-of-flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable region presence, and/or other data, including data described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., images, labeled images) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 546, a perception component 544, and a map component 548. In some instances, the perception component 544 can substantially correspond to the perception component 522 and can include substantially similar functionality. In some instances, the planning component 546 can substantially correspond to the planning component 524 and can include substantially similar functionality. The memory 542 may also include a map evaluation component(s) 550 that may include one or more of a map quality determination component 552 and/or an operation map determination component 554.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

EXAMPLE CLAUSES

The following paragraphs describe various examples. Any of the examples in this section may be used with any other of the examples in this section and/or any of the other examples described herein.

A: A system comprising: one or more processors; and one or more non-transitory computer-readable media storing instructions executable by the one or more processors, wherein the instructions, when executed, cause the system to perform operations comprising: receiving sensor data associated with an environment from a plurality of sensor systems of a first vehicle; determining, based at least in part on measurements associated with the sensor data and a trajectory of the first vehicle, first map data representing the environment; determining, based at least in part on the measurements associated with the sensor data and the trajectory, a first map quality indicator representing a dissonance between states of the first vehicle along the trajectory and the measurements associated with the sensor data; determining, based at least in part on the first map data, a second map quality indicator representing a fit of reprojections of the sensor data based at least in part on the trajectory and the first map data; determining, based at least in part on the first map quality indicator and the second map quality indicator, a first map quality value; determining, based at least on a comparison of the first map quality value and a second map quality value associated with second map data, an operational map; and controlling a second vehicle in the environment based at least in part on the operational map.

B: The system of paragraph A, wherein: the operational map is based at least in part on the second map data; and determining the operational map comprises: determining that the first map quality value is less than the second map quality value; and based at least in part on determining that the first map quality value is less than the second map quality value, replacing the operational map with a map generated based at least in part on the first map data.

C: The system of paragraph A or B, wherein: the operational map is based at least in part on the second map data; and determining the operational map comprises: determining that the first map quality value is greater than the second map quality value; and based at least in part on determining that the first map quality value is greater than the second map quality value, retaining the operational map based at least in part on the second map data.

D: The system of any of paragraphs A-C, wherein determining the first map quality indicator and the second map quality indicator does not require ground truth data for the sensor data.

E: The system of any of paragraphs A-D, wherein the operations further comprise determining a third map quality indicator representing a consistency level associated with the first map data; and determining the first map quality value further based at least in part on the third map quality indicator.

F: One or more non-transitory computer-readable media storing instructions that, when executed by one or more processors, perform operations comprising: receiving sensor data associated with an environment; determining, based at least in part on the sensor data and a trajectory, map data representing the environment; determining, based at least in part on measurements associated with the sensor data and the trajectory, a first map quality indicator representing a difference between state data associated with the trajectory and the measurements; determining, based at least in part on the map data, a second map quality indicator representing a fit of reprojections of the sensor data using the trajectory and the map data; determining, based at least in part on the first map quality indicator and the second map quality indicator, a map quality value; and determining, based at least on the map quality value, an operational map for controlling a vehicle in the environment.

G: The one or more non-transitory computer-readable media of paragraph F, wherein the operations further comprise determining, based at least in part on the map data and historical map data, a third map quality indicator representing a consistency level between the map data and the historical map data.

H: The one or more non-transitory computer-readable media of paragraph G, wherein determining the third map quality indicator is further based at least in part on one or more of the first map quality indicator or the second map quality indicator.

I: The one or more non-transitory computer-readable media of any of paragraphs F-H, wherein the map data comprises one or more factor graphs representing: a plurality of vehicle states at corresponding locations along the trajectory; and a plurality of landmark locations for landmarks detected in the environment based at least in part on the sensor data, wherein the plurality of landmark locations correspond to the plurality of vehicle states.

J: The one or more non-transitory computer-readable media of any of paragraphs F-I, wherein the operations further comprise providing the operational map to the vehicle for use in a vehicle localization operation.

K: The one or more non-transitory computer-readable media of any of paragraphs F-J, wherein the map quality value is a vector comprising the first map quality indicator and the second map quality indicator.

L: The one or more non-transitory computer-readable media of paragraph K, wherein determining the operational map comprises: determining that the first map quality indicator is less than a third map quality indicator of a second vector representing a second map quality value for historical map data; determining that the second map quality indicator is less than a fourth map quality indicator of the second vector; and determining the operational map based at least in part on the map data.

M: The one or more non-transitory computer-readable media of any of paragraphs F-L, wherein determining the first map quality indicator is further based at least in part on weighting at least a subset of the measurements.

N: The one or more non-transitory computer-readable media of any of paragraphs F-M, wherein determining the operational map comprises: determining that a second map quality value for historical map data is less than the map quality value; and determining the operational map based at least in part on the historical map data.

O: A method comprising: determining sensor data associated with an environment provided by a vehicle traversing the environment; determining, based at least in part on the sensor data, first map data representing the environment; determining, based at least in part on the first map data and not requiring ground truth data for the sensor data associated with the environment, a plurality of map quality indicators; determining, based at least in part on the plurality of map quality indicators, a first map quality value; and determining, based at least on a comparison of the first map quality value with a second map quality value associated with second map data, a higher quality map.

P: The method of paragraph O, further comprising: determining the first map data further based at least in part a first map generation operation; and determining the second map data based at least in part on the sensor data and a second map generation operation distinct from the first map generation operation.

Q: The method of paragraph O or P, further comprising determining the plurality of map quality indicators further based at least in part on a factor graph based at least in part on the first map data.

R: The method of any of paragraphs O-Q, further comprising determining the plurality of map quality indicators by substantially simultaneously executing a plurality of operations to determine the plurality of map quality indicators, wherein individual operations of the plurality of operations correspond to individual indicators of the plurality of map quality indicators.

S: The method of any of paragraphs O-R, wherein determining the higher quality map comprises: determining that the second map quality value is less than the first map quality value; and retaining a map associated with the second map data as an operational map.

T: The method of any of paragraphs O-S, further comprising determining a map quality trend based at least in part on the first map quality value and the second map quality value.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the system to perform operations comprising:

receiving sensor data associated with an environment from a plurality of sensor systems of a first vehicle;

determining, based at least in part on measurements associated with the sensor data and a trajectory of the first vehicle, first map data representing the environment;

determining, based at least in part on the measurements associated with the sensor data and the trajectory, a first map quality indicator comprising a weighted sum of average link cost (WSALC) value based at least in part on a dissonance between states of the first vehicle along the trajectory and the measurements associated with the sensor data;

determining, based at least in part on the first map data, a second map quality indicator comprising an average mesh posterior rate (AMPR) value based at least in part on lidar reprojections of the sensor data based at least in part on the trajectory and the first map data;

determining, based at least in part on the first map quality indicator and the second map quality indicator, a first map quality value;

determining, based at least on a comparison of the first map quality value and a second map quality value associated with second map data, an operational map; and controlling a second vehicle in the environment based at least in part on the operational map.

2. The system of claim 1, wherein:

the operational map is based at least in part on the second map data; and determining the operational map comprises:

determining that the first map quality value is less than the second map quality value; and based at least in part on determining that the first map quality value is less than the second map quality value, replacing the operational map with a map generated based at least in part on the first map data.

3. The system of claim 1, wherein:

the operational map is based at least in part on the second map data; and determining the operational map comprises:

determining that the first map quality value is greater than the second map quality value; and based at least in part on determining that the first map quality value is greater than the second map quality value, retaining the operational map based at least in part on the second map data.

4. The system of claim 1, wherein determining the first map quality indicator and the second map quality indicator does not require ground truth data for the sensor data.

5. The system of claim 1, wherein:

the operations further comprise determining a third map quality indicator representing a consistency level associated with the first map data; and determining the first map quality value further based at least in part on the third map quality indicator.

6. One or more non-transitory computer-readable media storing instructions that, when executed by one or more processors, perform operations comprising:

receiving sensor data associated with an environment;

determining, based at least in part on the sensor data and a trajectory, map data representing the environment;

determining, based at least in part on measurements associated with the sensor data and the trajectory, a first map quality indicator comprising a weighted sum of average link cost (WSALC) value based at least in part on a difference between state data associated with the trajectory and the measurements;

determining, based at least in part on the map data, a second map quality indicator comprising an average mesh posterior rate (AMPR) value based at least in part on lidar reprojections of the sensor data using the trajectory and the map data;

determining, based at least in part on the first map quality indicator and the second map quality indicator, a map quality value;

determining, based at least on the map quality value, an operational map for controlling a vehicle in the environment; and controlling the vehicle in the environment based at least in part on the operational map.

7. The one or more non-transitory computer-readable media of claim 6, wherein determining the operational map comprises determining, based at least in part on the map quality value, to retain a current operational map as the operational map.

8. The one or more non-transitory computer-readable media of claim 7, wherein determining the operational map comprises determining, based at least in part on the map quality value, to replace a current operational map with the operational map.

9. The one or more non-transitory computer-readable media of claim 6, wherein the map data comprises one or more factor graphs representing:

a plurality of vehicle states at corresponding locations along the trajectory; and a plurality of landmark locations for landmarks detected in the environment based at least in part on the sensor data, wherein the plurality of landmark locations corresponds to the plurality of vehicle states.

10. The one or more non-transitory computer-readable media of claim 6, wherein the operations further comprise providing the operational map to the vehicle for use in a vehicle localization operation.

11. The one or more non-transitory computer-readable media of claim 6, wherein the map quality value is a vector comprising the first map quality indicator and the second map quality indicator.

12. The one or more non-transitory computer-readable media of claim 11, wherein determining the operational map comprises:

determining that the first map quality indicator is less than a third map quality indicator of a second vector representing a second map quality value for historical map data;

determining that the second map quality indicator is less than a fourth map quality indicator of the second vector; and determining the operational map based at least in part on the map data.

13. The one or more non-transitory computer-readable media of claim 6, wherein determining the first map quality indicator is further based at least in part on weighting at least a subset of the measurements.

14. The one or more non-transitory computer-readable media of claim 6, wherein determining the operational map comprises:

determining that a second map quality value for historical map data is less than the map quality value; and determining the operational map based at least in part on the historical map data.

15. A method comprising:

determining sensor data associated with an environment provided by a vehicle traversing the environment;

determining, based at least in part on the sensor data and a trajectory, map data representing the environment;

determining, based at least in part on measurements associated with the sensor data and the trajectory, a first map quality indicator comprising a weighted sum of average link cost (WSALC) value based at least in part on a difference between state data associated with the trajectory and the measurements, determining, based at least in part on the map data, a second map quality indicator comprising an average mesh posterior rate (AMPR) value based at least in part on lidar reprojections of the sensor data using the trajectory and the map data;

determining, based at least in part on the first map quality indicator and the second map quality indicator, a map quality value;

determining, based at least on the map quality value, a map; and controlling the vehicle in the environment based at least in part on the map.

16. The method of claim 15, further comprising:

determining the map data further based at least in part a first map generation operation; and determining second map data based at least in part on the sensor data and a second map generation operation distinct from the first map generation operation.

17. The method of claim 15, further comprising determining one or more of the first map quality indicator or the second map quality indicator further based at least in part on a factor graph based at least in part on the map data.

18. The method of claim 15, further comprising determining one or more of the first map quality indicator or the second map quality indicator by substantially simultaneously executing a plurality of operations to determine the one or more of the first map quality indicator or the second map quality indicator, wherein individual operations of the plurality of operations correspond to individual indicators of one or more of the first map quality indicator or the second map quality indicator.

19. The method of claim 15, wherein determining the map comprises:

determining that the map quality value is less than a second map quality value associated with second map data; and retaining a second map associated with the second map data as an operational map.

20. The method of claim 19, further comprising determining a map quality trend based at least in part on the map quality value and the second map quality value.

* * * * *